(12) United States Patent
Indiresan et al.

(10) Patent No.: US 10,938,685 B2
(45) Date of Patent: Mar. 2, 2021

(54) SECURE TRAFFIC VISIBILITY AND ANALYTICS FOR ENCRYPTED TRAFFIC

(71) Applicant: Cisco Technology, Inc., San Jose, CA (US)

(72) Inventors: Atri Indiresan, Sunnyvale, CA (US);
Linda Tin-Wen Cheng, San Jose, CA (US); Melvin Tsai, Palo Alto, CA (US);
Peter Geoffrey Jones, Campbell, CA (US); Da-Yuan Tung, Cupertino, CA (US); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 16/043,779

(22) Filed: Jul. 24, 2018

(65) Prior Publication Data

US 2020/0036610 A1    Jan. 30, 2020

(51) Int. Cl.
*H04L 12/26*    (2006.01)
*H04L 12/741*   (2013.01)
(Continued)

(52) U.S. Cl.
CPC .......... *H04L 43/062* (2013.01); *H04L 43/045* (2013.01); *H04L 45/745* (2013.01);
(Continued)

(58) Field of Classification Search
CPC ............. H04L 12/4633; H04L 12/4641; H04L 63/0272; H04L 45/74; H04L 63/029; H04L 45/38; H04L 49/70; H04L 45/586; H04L 69/22; H04L 45/22; H04L 63/0428; H04L 41/0806; H04L 41/0886; H04L 45/24; H04L 67/1097; H04L 12/66; H04L 41/12; H04L 43/0864; G06F 9/45558
See application file for complete search history.

(56) References Cited

U.S. PATENT DOCUMENTS

| 6,938,021 | B2 * | 8/2005 | Shear ................ | G06Q 20/3674 |
| | | | | 705/67 |
| 8,825,611 | B1 * | 9/2014 | Jorgensen .......... | G06F 21/6218 |
| | | | | 707/694 |

(Continued)

OTHER PUBLICATIONS

Calhoun, P., et al., "Control and Provisioning of Wireless Access Points (CAPWAP) Protocol Specification," IETF, Network Working Group, RFC 5415, Internet Standards Track, 2009, 156 pages.

(Continued)

*Primary Examiner* — Ninos Donabed
(74) *Attorney, Agent, or Firm* — Meunier Carlin & Curfman LLC

(57) ABSTRACT

Presented herein is an exemplified system and method that provides visibility, for traffic analytics, into secured encapsulated packet (e.g., secure VXLAN-GPE packet, a secure metadata-GPE packet or other GPE standards). The exemplified system and method facilitate encryption of traffic in a granular manner that also facilitate the monitoring of said secure traffic in a fabric network in an end-to-end manner throughout the network. Such monitoring can be beneficially used for analytics, performance analysis, and network debugging/troubleshooting.

15 Claims, 8 Drawing Sheets

(51) Int. Cl.
*H04L 29/06* (2006.01)
*H04L 12/46* (2006.01)

(52) U.S. Cl.
CPC .......... *H04L 63/0428* (2013.01); *H04L 63/20* (2013.01); *H04L 69/22* (2013.01); *H04L 12/4633* (2013.01); *H04L 12/4641* (2013.01); *H04L 2212/00* (2013.01)

(56) References Cited

U.S. PATENT DOCUMENTS

| | | | | |
|---|---|---|---|---|
| 9,407,450 | B2* | 8/2016 | Singh | H04L 43/00 |
| 9,967,372 | B2* | 5/2018 | Arangasamy | H04L 69/22 |
| 10,038,627 | B2* | 7/2018 | Pukhraj Jain | H04L 12/4633 |
| 10,104,050 | B2* | 10/2018 | Wainner | H04L 63/0272 |
| 2004/0049702 | A1* | 3/2004 | Subramaniam | G06Q 20/382 |
| | | | | 726/28 |
| 2008/0167774 | A1* | 7/2008 | Patel | G08G 1/20 |
| | | | | 701/36 |
| 2009/0285091 | A1* | 11/2009 | Hiscock | H04L 47/10 |
| | | | | 370/230 |
| 2011/0004932 | A1* | 1/2011 | Spatscheck | H04L 63/0236 |
| | | | | 726/13 |
| 2012/0266209 | A1* | 10/2012 | Gooding | H04L 63/20 |
| | | | | 726/1 |
| 2013/0117847 | A1* | 5/2013 | Friedman | H04L 63/102 |
| | | | | 726/22 |
| 2013/0268357 | A1* | 10/2013 | Heath | G06Q 30/02 |
| | | | | 705/14.53 |
| 2013/0297768 | A1* | 11/2013 | Singh | H04L 43/00 |
| | | | | 709/224 |
| 2014/0192808 | A1* | 7/2014 | Thubert | H04L 45/74 |
| | | | | 370/392 |
| 2015/0063158 | A1* | 3/2015 | Nedeltchev | H04W 24/08 |
| | | | | 370/253 |
| 2015/0229617 | A1* | 8/2015 | Puri | H04L 63/0435 |
| | | | | 713/171 |
| 2015/0341259 | A1* | 11/2015 | Li | H04L 12/462 |
| | | | | 370/392 |
| 2016/0277293 | A1* | 9/2016 | Lopez | H04L 43/028 |
| 2017/0005943 | A1* | 1/2017 | Raj | H04L 45/38 |
| 2017/0033924 | A1* | 2/2017 | Jain | H04L 9/0819 |
| 2017/0093700 | A1* | 3/2017 | Gilley | H04L 63/20 |
| 2017/0104851 | A1* | 4/2017 | Arangasamy | H04L 69/22 |
| 2017/0324714 | A1* | 11/2017 | Wainner | H04L 63/0272 |
| 2017/0346731 | A1* | 11/2017 | Pukhraj Jain | H04L 45/38 |
| 2018/0219805 | A1* | 8/2018 | MacNeil | G06F 3/0619 |
| 2018/0227229 | A1* | 8/2018 | Lopez | H04L 61/1511 |

OTHER PUBLICATIONS

Mahalingam, M., et al., "Virtual eXtensible Local Area Network (VXLAN): A Framework for Overlaying Virtualized Layer 2 Networks over Layer 3 Networks," IETF, RFC 7348, Informational, 2014, 23 pages.

International Search Report and Written Opinion, dated Oct. 9, 2019, received in connection with International Patent Application No. PCT/US2019/043171.

* cited by examiner

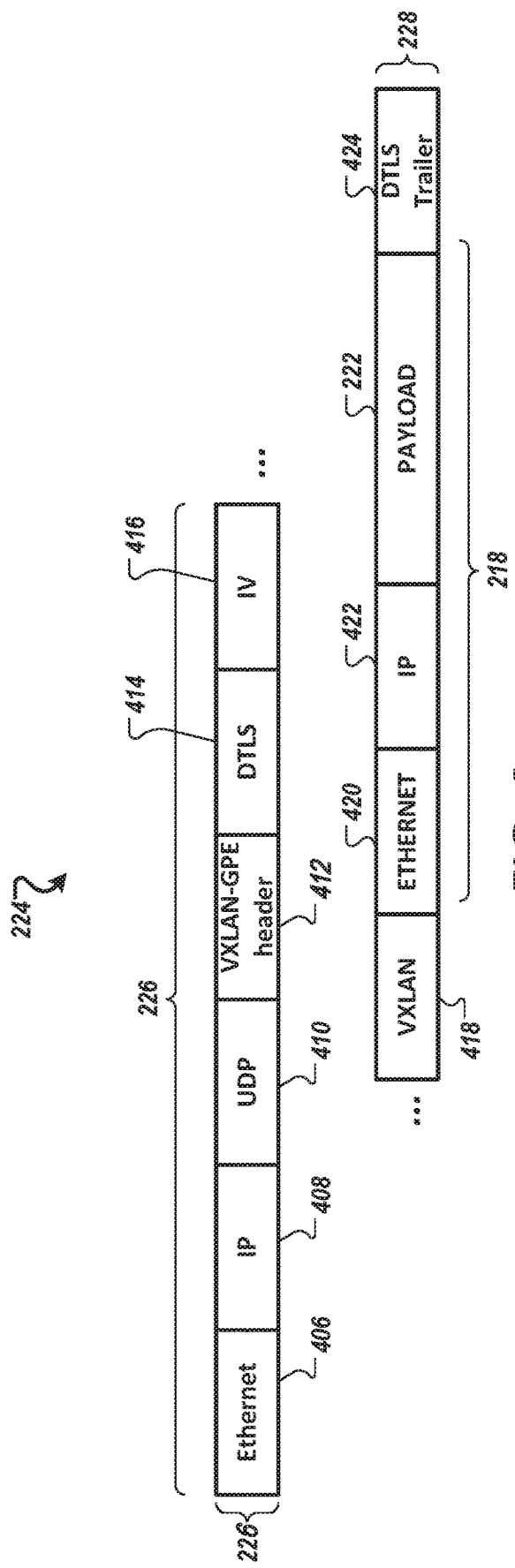

*Crypto Decapsulation sequence (inbound)*

Pass 1:
- Get SA Index from Src/Dst IP, VxlanDtls
- udp.dport = vxlan (from SA lookup)
- delete 4 bytes from VxLANDTLS, ip.len, udp.len
- Recirc through SEC SEC:
- Decrypt, delete VxLANDtls, DTLS, IV, Trailer Pass 2/3:
- Regular VxLAN decap

SECURE TRAFFIC VISIBILITY AND ANALYTICS FOR ENCRYPTED TRAFFIC

TECHNICAL FIELD

The present disclosure relates to operating an encrypted traffic, in particular, to perform visibility and analytics of tunnel encapsulated traffic.

BACKGROUND

An IP tunnel is an Internet Protocol (IP) network communications channel between two networks or nodes in a same network that uses encapsulation technology for the transport. IP tunnels are often implemented to connect two disjointed IP networks that do not have a native routing path to each other and use an underlying routable protocol across an intermediate transport network. Examples of such protocols include the Virtual Extensible Local Area Network (VxLAN) protocol, IPv4-to-IPv6 protocol, and the Internet Protocol Security (IPSec) protocol.

Virtual Extensible Local Area Network (VxLAN) is an encapsulation protocol for running an overlay network on an existing infrastructure (e.g., Layer-3 infrastructure). VXLAN defines an encapsulation format that encapsulates Ethernet frames in an outer UDP/IP transport. VXLAN can be extended, via General Protocol Extension (GPE), to provide protocol typing and OAM capabilities. Neither Generic Protocol Extension (GPE) nor Virtual Extensible Local Area Network (VxLAN) protocols natively or conventionally provide for security mechanisms. Internet Protocol Security (IPSec) is conventionally used to transport unicast packets not multicast & broadcast.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 is a diagram showing an example encrypted-encapsulated packet having a metadata header (e.g., a VXLAN-GPE header, a metadata GPE header, or other packet metadata-based encapsulated header) and is generated for both security and visibility in accordance with an illustrative embodiment.

DESCRIPTION OF EXAMPLE EMBODIMENTS

Overview

Figure 1:
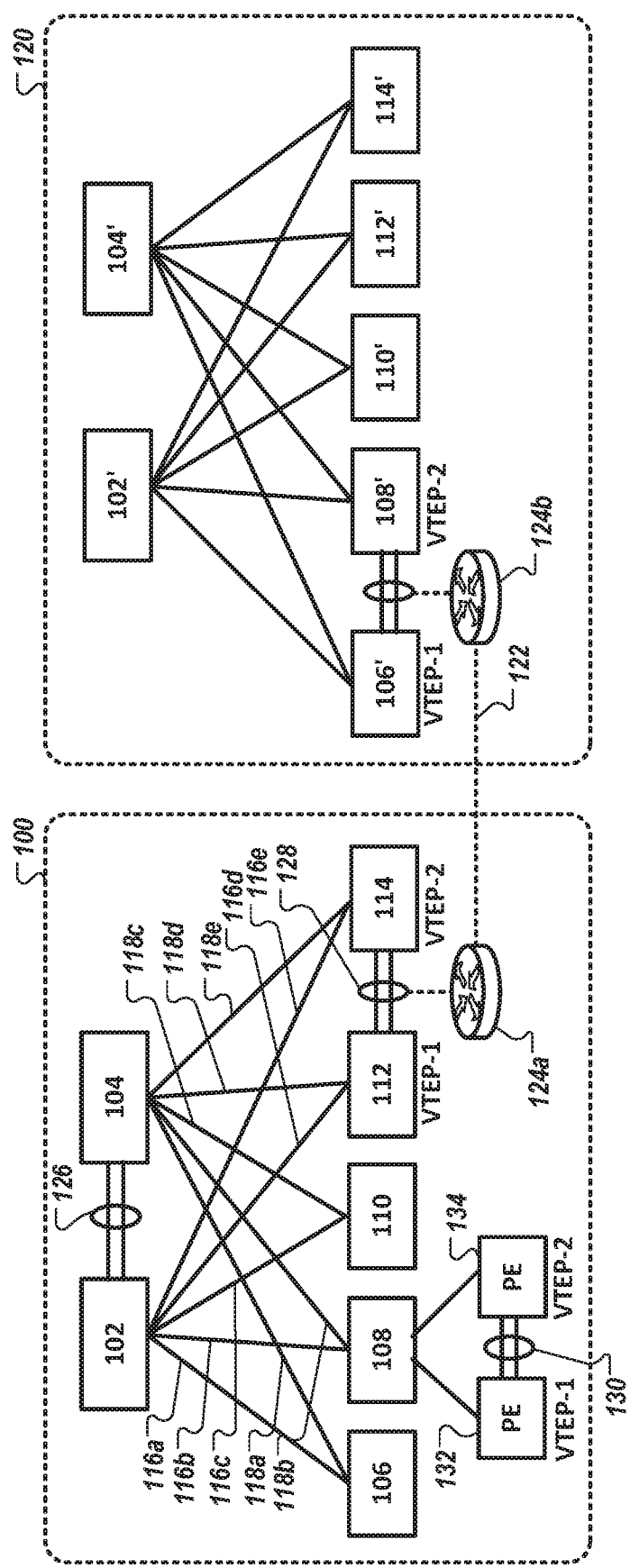
FIG. 1 is a diagram illustrating an example network that includes one or more network devices configured to establishing a tunnel interface in a network, in accordance with an embodiment.

Presented herein is an exemplified system and method that provide visibility, for traffic analytics, into a secured encapsulated packet (e.g., a secure VXLAN-GPE packet, a secure metadata GPE packet, or other GPE standards). The exemplified system and method facilitate encryption of traffic in a granular manner that can facilitate the monitoring of said secure traffic in a fabric network in an end-to-end manner throughout the network. Such monitoring can be beneficially used, for example, for analytics, performance analysis, and network debugging/troubleshooting.

In some embodiments, the exemplified system and method facilitate distribution and collection of packet metadata that can be used at the secure edges of the network as well as at a centralized, secure, collector that can use this information to provide valuable insight into traffic throughout the network. The exemplified system and method can be used to provide a security mechanism for handling encrypted traffic within a VXLAN fabric, or any overlay Fabric such as Locator/ID Separation Protocol (LISP), General Routing Encapsulation (GRE) protocol, etc.

While applications such as Netflow are often used for traffic analytics, many applications need to encrypt traffic for secure end-to-end communication. In some embodiments, security may be required for devices and services which are operating in the Fabric network overlay, but which may not perform their own cryptographic operations. Further, additional security may need to be applied to devices and services in which the security provided by such devices or services are incomplete or unknown to the network manager (e.g., Internet of Things (IoT) devices), or device/user/application sets for which an additional level of security may be desired or required. IoT devices (e.g., door locks, badge readers, cameras, and the like) often transmit potentially sensitive data and may benefit from additional encryption, when desired.

In an aspect, a method is disclosed of collecting security, flow, and/or routing information associated with an encrypted-encapsulated packet. The method includes, in a network, receiving, at an ingress network node (e.g., ingress VTEP), a packet to selectively apply, according to one or more policies enforced at the ingress network node, an encrypted encapsulation (e.g., an encrypted VXLAN encapsulation or encrypted metadata GPE encapsulation) to generate an encrypted-encapsulated packet (e.g., an encrypted VXLAN encapsulated packet or encrypted metadata GPE encapsulation); generating, at the ingress network node, the encrypted-encapsulated packet by (i) encrypting the packet having included a packet header and a packet payload to form an encrypted payload of the encrypted-encapsulated packet and (ii) inserting an encapsulation header (e.g., VXLAN header, VXLAN-GPE header, metadata GPE header, or other packet metadata-based encapsulated header) to the encrypted-encapsulated packet, wherein the encapsulation header comprises one or more metadata information derived, or retrieved, from the header or the payload of the received packet, wherein the one or more metadata information is inserted (e.g., as an encrypted or an unencrypted string) into one or more pre-defined fields in the encapsulation header; and, transmitting, at the ingress network node, over a tunnel (e.g., associated with the encapsulation), the encrypted-encapsulated packet to an egress network node (e.g., egress VTEP) located in the network. In some embodiments, the one or more metadata information is subsequently collected, by an intermediary node (e.g., a controller, switch, router, controller, network addressor translation (NAT) device, an intrusion prevention system (IPS), an intrusion detection system (IDS), a deep packet inspection (DPI) device, a firewall, a computing device executing a virtual switch, a network-attached storage (NAS) device, a load balancer (LB) system, a wide-area network/local-area network (WAN/LAN) accelerator, and a computing system executing a virtual machine (VM) or any network device) located between, or able to observe traffic between, the ingress network node and egress network node, to be subsequently analyzed individually or in combination with other collected metadata information, wherein the intermediary node collects the one or more metadata information by interrogating (the unencrypted or encrypted string) in the one or more pre-defined fields of the encapsulation header.

In some embodiments, the method further includes forwarding, at the intermediary node, the one or more metadata information to a collector (e.g., a secure collector) for subsequent analysis (e.g., flow analytics).

In some embodiments, the collector is configured to store the one or more metadata information and other metadata information collected from other encrypted-encapsulated packets (e.g., encrypted VXLAN packet or encrypted metadata GPE packet, etc.) (e.g., to generate a report from the collected metadata information for the purpose of analyzing security, flow, and/or routing of packets, or flows associated therewith, in the network).

In some embodiments, the collector is further configured to store IP traffic data (e.g., Netflow-based data, NetStream-based data, Mow-based data, Cflowd-based data, Rflow-based data, AppFlow-based data, sFlow-based data) collected from the network (e.g., wherein the IP traffic data is encrypted).

In some embodiments, the method further includes receiving, at the egress network node (e.g., egress VTEP), the encrypted-encapsulated packet; and generating, at the egress network node, the packet, wherein the packet having included the packet header and packet payload is generated by decrypting the encrypted payload.

In some embodiments, the encapsulation header comprises a VXLAN header in which the VXLAN header (e.g., a VXLAN GPE header) includes a number of allocate-able bits for inclusion of the one or more metadata information selected from the group consisting of: at least 16 bits, at least 32 bits, and at least 48 bits (e.g., one or more bits located between bit location 8 and bit location 23 and/or between bit location 32 and bit location 63 of the VXLAN GPE header).

In some embodiments, the encapsulation header comprises a metadata GPE header in which the metadata GPE header includes a number of allocate-able bits for inclusion of the one or more metadata information selected from the group consisting of: at least 24 bits, and at least 56 bits (e.g., one or more bits located between bit location 0 and bit location 23 and/or between bit location 32 and bit location 63 of the header).

In some embodiments, the one or more metadata information are specified in the one or more policies, wherein the one or more policies are editable i) by a controller (e.g., a SDN controller) located in the network and/or ii) by a network administrator through a computing terminal having access to the network.

In some embodiments, the one or more metadata information includes an identifier selected from the group consisting of a source IP address associated with the packet; a destination IP address associated with the packet; a security group tag (SGT) associated with the packet; a VXLAN network identifier (VNI) associated with the packet; a user identifier associated with the packet; a user-group identifier associated with the packet; a subnet address associated with the packet; a subnet group address associated with the packet; an application identifier associated with an application (e.g., executable code or binaries) executing on a computing device that is origin to the packet; a virtualized instance identifier of a computing device (e.g., a VM instance) in the network that is origin to the packet; and a combination thereof.

In some embodiments, the one or more metadata information are inserted as one or more unencrypted strings into one or more pre-defined fields in the encapsulation header.

In some embodiments, the one or more metadata information are inserted as one or more encrypted strings into one or more pre-defined fields in the encapsulation header.

In another aspect, a system (e.g., an ingress VTEP) is disclosed comprising: a network interface (e.g., comprising an ASIC, FPGA, CPLD, microprocessor, etc.) having instructions stored thereon, wherein execution of the instructions, cause the interface to: upon receipt of a packet (e.g., determined to match one or more policies enforced at the system), generate an encrypted-encapsulated packet (e.g., encrypted VXLAN packet or encrypted metadata GPE encapsulation) by (i) encrypting the packet having included a packet header and packet payload to form an encrypted payload of the encrypted-encapsulated packet and (ii) inserting an encapsulation header to the encrypted-encapsulated packet, wherein the encapsulation header comprises one or more metadata information derived, or retrieved, from the header or payload of the received packet, wherein the one or more metadata information is inserted (e.g., as one or more unencrypted or encrypted strings) into one or more pre-defined fields of the encapsulation header; and transmit, over a tunnel (e.g., associated with the encapsulation), the encrypted-encapsulated packet to an egress network node (e.g., egress VTEP) located in the network, wherein the one or more metadata information is subsequently collected, by an intermediary node (e.g., switch, router, controller, or any network device) located between, or able to observe traffic between, the ingress network node and egress network node, to be subsequently analyzed individually or in combination with other collected metadata information, wherein the intermediary node collects the one or more metadata information by interrogating (e.g., the unencrypted or the encrypted strings) in the one or more pre-defined fields of the encapsulation header.

In some embodiments, the collector is configured to store the one or more metadata information and other metadata information collected from other encrypted-encapsulated packets (e.g., encrypted VXLAN packet, or encrypted metadata GPE packet, etc.) (e.g., to generate a report from the collected metadata information for the purpose of analyzing security, flow, and/or routing of packets, or flows associated therewith, in the network).

In some embodiments, the encapsulation header comprises a VXLAN-GPE header, in which the VXLAN-GPE header includes a number of allocate-able bits for inclusion of the one or more metadata information selected from the group consisting of: at least 16 bits, and at least 48 bits (e.g., one or more bits located between bit location 8 and bit location 23 and/or between bit location 32 and bit location 63 of the VXLAN GPE header).

In some embodiments, the encapsulation header comprises a metadata GPE header (e.g., a GPE DTLS header) that includes a number of allocate-able bits for inclusion of the one or more metadata information selected from the group consisting of at least 24 bits and at least 56 bits (e.g., one or more bits located between bit location 0 and bit location 23 and/or between bit location 32 and bit location 63 of the header).

In some embodiments, the encapsulation header is selected from the group consisting of a VXLAN GPE header, and a metadata GPE header.

In some embodiments, the encapsulation header includes a metadata DTLS header (i.e., a VXLAN-GPE header or a metadata GPE header having next-protocol field set to a DTLS-specified value).

In some embodiments, the one or more metadata information is specified in the one or more policies, wherein the one or more policies are editable i) by a controller located in the network or ii) by a network administrator through a computing terminal having access to the network.

In some embodiments, the system further includes a memory having instructions stored thereon, wherein execution of the instructions by one or more processors of the system, cause the processor to: receive the one or more policies from a computing device external to the system (e.g., i) a controller located in the network or ii) by a network administrator through a computing terminal having access to the network); and apply the one or more policies to incoming traffic received at the network interface.

In some embodiments, the one or more metadata information includes an identifier selected from the group consisting of: a source IP address associated with the packet; a destination IP address associated with the packet; a security group tag associated with the packet; a VXLAN network identifier (VNI) associated with the packet; a user identifier associated with the packet; a user-group identifier associated with the packet; a subnet address associated with the packet; a subnet group address associated with the packet; a source application (executable code or binaries) executing on a computing device that is origin to the packet; a virtualized instance of a computing device in the network that is origin to the packet; and a combination thereof.

In another aspect, a system (e.g., egress VTEP) is disclosed, comprising: a network interface (e.g., comprising an ASIC, FPGA, CPLD, microprocessor, etc.) having instructions stored thereon, wherein execution of the instructions, cause the interface to: upon receipt of an encrypted encapsulated packet (e.g., determined to match one or more policies enforced at the system) having an encrypted-encapsulation header and an encrypted payload, generate an unencrypted packet having included a packet header and a packet payload from the encrypted payload; and, transmit the unencrypted packet to a next hop in the network based on routing information identified in the unencrypted packet, wherein the encrypted-encapsulated packet (e.g., encrypted VXLAN packet, or encrypted metadata GPE packet, etc.) was generated by (i) encrypting the packet having included the packet header and the packet payload to form the encrypted payload and (ii) inserting the encapsulation header to the encrypted-encapsulated packet, wherein the encapsulation header comprises one or more metadata information derived, or retrieved, from the packet header or the packet payload, wherein the one or more metadata information is inserted (e.g., as an unencrypted or encrypted string) into one or more pre-defined fields of the encapsulation header, and wherein the one or more metadata information is collectable, by an intermediary node (e.g., switch, router, controller, or any network device) located between, or able to observe traffic between, the ingress network node and egress network node, to be analyzed individually or in combination with other collected metadata information, wherein the intermediary node collects the one or more metadata information by interrogating in the one or more pre-defined fields of the encapsulation header.

In some embodiments, the network interface is configurable via instructions to forward the one or more metadata information to a collector (e.g., a secure collector) located in the network, wherein the collector is configured to store the one or more metadata information and other metadata information collected from other encrypted-encapsulated packets (e.g., encrypted VXLAN packet, or encrypted metadata GPE packet, etc.) (e.g., to generate a report from the collected metadata information for the purpose of analyzing security, flow, and/or routing of packets, or flows associated therewith, in the network).

In some embodiments, the encapsulation header comprises a VXLAN DTLS header or a metadata DTLS header.

In some embodiments, the one or more metadata information includes an identifier selected from the group consisting of: a source IP address associated with the packet; a destination IP address associated with the packet; a security group tag associated with the packet; a VXLAN network identifier (VNI) associated with the packet; a source IP address associated with the packet; a destination IP address associated with the packet; a security group tag associated with the packet; a VXLAN network identifier (VNI) associated with the packet; a user identifier associated with the packet; a user-group identifier associated with the packet; a subnet address associated with the packet; a subnet group address associated with the packet; a source application (executable code or binaries) executing on a computing device that is origin to the packet; a virtualized instance of a computing device in the network that is origin to the packet; and a combination thereof.

Example Network

FIG. 1 is a diagram illustrating an example network 100 that includes one or more network devices configured to establish a tunnel interface, in accordance with an embodiment.

As shown in FIG. 1, as a non-limiting example, the network 100 includes a plurality of nodes (e.g., router or switches) (shown as "node-A" 102 and "node-B" 104) that are coupled to a plurality of secondary nodes (e.g., router or switches) (shown as node 106, node 108, node 110, node 112, and node 114) across a number of links (shown as 116*a*-116*e* and 118*a*-118*e*). This topology may be found, for example, but not limited to, in a data center fabric or MPLS cloud. As shown in FIG. 1, the network 100 is coupled to a second network 120, e.g., another data center fabric or MPLS cloud.

The exemplified system and method may be used to provide visibility, for traffic analytics, into secured encapsulated packet (e.g., secure VXLAN packet or secure GRE packet) that may be transmitted over tunnels 122 established between two data center network fabrics (e.g., 100 and 120) interconnected, e.g., using a Layer-3 core network (labeled as 124a and 124b).

Further, in some embodiments, IP tunnels (e.g., shown as 126) may be established between nodes 102 and nodes 104. IP tunnels (e.g., shown as 128) can also be established between secondary nodes (e.g., shown as 112 and 114). IP tunnels (e.g., shown as 130) can also be established between virtual or physical machines (e.g., shown as 132 and 134).

It should be appreciated that FIG. 1 is provided as a non-limiting example to demonstrate the various embodiments disclosed herein. Other network topologies may be used—for example, other customer edge devices or provider edge devices may be used with the embodiments disclosed herein, including VXLAN fabric, or any overlay Fabric such as Locator/ID Separation Protocol (LISP), General Routing Encapsulation (GRE) protocol, etc.

Example Operation

Figure 2:
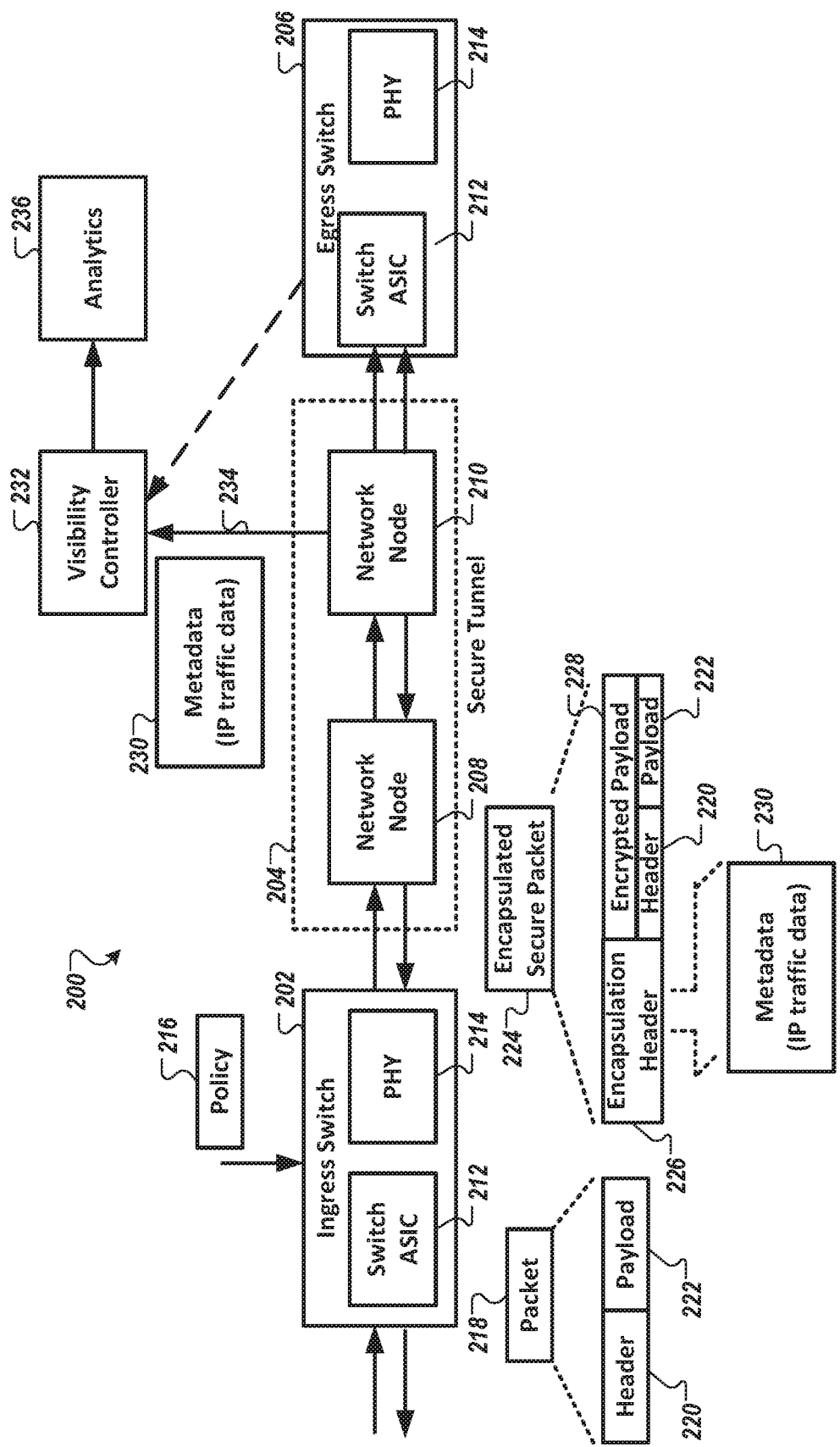
FIG. 2 is a diagram of a system that facilitates the injection of security, flow, and/or routing metadata information in the header of an encrypted-encapsulated packet at tunnel endpoint nodes in a fabric to provide visibility at intermediary nodes of the fabric in accordance with an embodiment.

FIG. 2 is a diagram of a system 200 that facilitates the injection of security, flow, and/or routing metadata information (e.g., as encrypted/opaque fields) into the header of an encrypted-encapsulated packet at tunnel endpoint nodes in a fabric to provide visibility at intermediary nodes of the fabric. While the current implementation applies, for example, to Software-Defined-Access technology based on VXLAN, these techniques are generally applicable to any encrypted tunneled encapsulation protocols (e.g., LISP, GRE, etc.).

In FIG. 2, an ingress switch 202 is shown to have established a secure tunnel (e.g., a secure VXLAN tunnel 204), across a plurality of intermediary nodes (e.g., shown as 208, 210), with an egress switch 206. The ingress switch 202 includes an application specific integrated circuit (e.g., shown as "Switch ASIC" 212) and a physical interface (e.g., shown as "PHY" 214) that manage, in whole or in part, a policy 216 to apply to incoming packets (e.g., shown as "Packet" 218). As used herein, an ASIC is also referred to as a processor, which can refer to any physical hardware device that executes encoded instructions for performing functions on inputs and creating outputs. Processor may include one or more processors, each configured to execute instructions and process data to perform one or more functions associated with a computer for indexing images. Processor may be communicatively coupled to RAM, ROM, storage, database, I/O devices, and interface. Referring still to FIG. 2, the packet 218 includes a header portion 220 and a payload 222. In some embodiments, the packet 218 is an encapsulated packets—that is, a packet that is already encapsulated with another protocol.

Upon receipt of the packet 218, the switch ASIC 212 is configured to generate, by selectively applying policies 216, an encapsulated secure packet 224 to transmit over the secure tunnel 204 to the egress switch 206. The encapsulated secure packet 224 includes a header (e.g., shown as "Encapsulation Header" 226) and a secure payload (e.g., shown as "Encrypted Payload" 228) that includes the header 220 and payload 222. Notably, the encapsulated secure packet 224 includes metadata information (e.g., shown as "Metadata (IP traffic data)" 230) derived, or retrieved, from the header or the payload of the received packet 218 and is inserted as a string (e.g., as one or more encrypted data strings or unencrypted data strings) into one or more pre-defined fields in the encapsulation header 226. In some embodiments, the metadata IP traffic data includes Netflow-based data, NetStream-based data, Jflow-based data, Cflowd-based data, Rflow-based data, AppFlow-based data, sFlow-based data, or other data that can be collected from the network.

Indeed, this exemplified topology facilitates the creation of encrypted overlay traffic flows in a Fabric environment that offers both i) flexibility for per-VN and/or per-SGT (or additional metadata) crypto granularity and ii) non-restrictive network-layer visibility to the VN/SGT/other level for network accounting and assurance purposes. Because intermediary network nodes will only see the already-encrypted traffic flow, the payload of the traffic is secured, but metadata (e.g., in the form of packet-transported metadata) can be made available for network visibility, thus, providing an extra encryption/security in a manner that does not compromise network visibility for this packet metadata at any point in the end-to-end path. Indeed, the metadata information 230 can be encrypted with a same or different encryption key as the encrypted payload 228. And, in some embodiments, the metadata information 230 is sent in the encapsulation header 226 in the clear (without encryption).

The exemplified topology facilitates analytics at intermediary nodes. Because these header fields can be made distinct from the payload 228, it is possible to derive a cryptographic key at a finer granularity. In some embodiments, the cryptographic key of the metadata information 230 may be based on the information in the header 220 or payload 222 of the received packet 218. In some embodiments, the cryptographic key of the metadata information 230 is received from a visibility controller 232. In some embodiments, the cryptographic key of the metadata information 230 is generated at the ingress switch 202 and shared to the visibility controller 232. In some embodiments, the cryptographic key of the metadata information is generated by a controller in the network that makes the key available to the ingress switch 202 and the visibility controller 232, among others.

As shown in FIG. 2, the metadata information 230 can be directly collected (e.g., 234) by intermediary nodes (e.g., network nodes 208, 210) associated with the secure tunnel 204 and transmitted to the visibility controller 232. The visibility controller 232 (e.g., a SDN controller located in the network or a secure collector) can be a separate, or same, controller used to manage the policies 216. In some embodiments, the visibility controller 232 is a storage area network (SAN) device. The visibility controller 232 can decrypt (if necessary), aggregate, and/or interpret the metadata information 230.

As shown in FIG. 2, once collected by the visibility controller 232, the metadata information 230 associated with encapsulated secure packet 224 can be used in analytics, performance analysis, and network debugging/troubleshooting (e.g., shown as "Analytics" 236). In some embodiments, the visibility controller 232 is a part of the analytics system 236. In addition to collecting the metadata information 230 at the intermediary nodes, the metadata information 230 can also be collected at the egress switch 206 as well as the ingress switch 202.

In some embodiments, the metadata information 230 includes a source IP address associated with the packet. In some embodiments, the metadata information 230 includes a destination IP address associated with the packet. In some embodiments, metadata information 230 includes a security group tag (SGT) associated with the packet. In some embodiments, metadata information 230 includes a VXLAN network identifier (VNI) associated with the packet. In some embodiments, metadata information 230 includes a user identifier associated with the packet. In some embodiments, metadata information 230 includes a user-group identifier associated with the packet. In some embodiments, metadata information 230 includes a subnet address associated with the packet; a subnet group address associated with the packet. In some embodiments, metadata information 230 includes an application identifier associated with an application (e.g., executable code or binaries) executing on a computing device that is origin to the packet. In some embodiments, metadata information 230 includes a virtualized instance identifier of a computing device (e.g., a VM instance) in the network that is origin to the packet. In some embodiments, metadata information 230 includes a combination of any of the above.

Example Method

Figure 3:
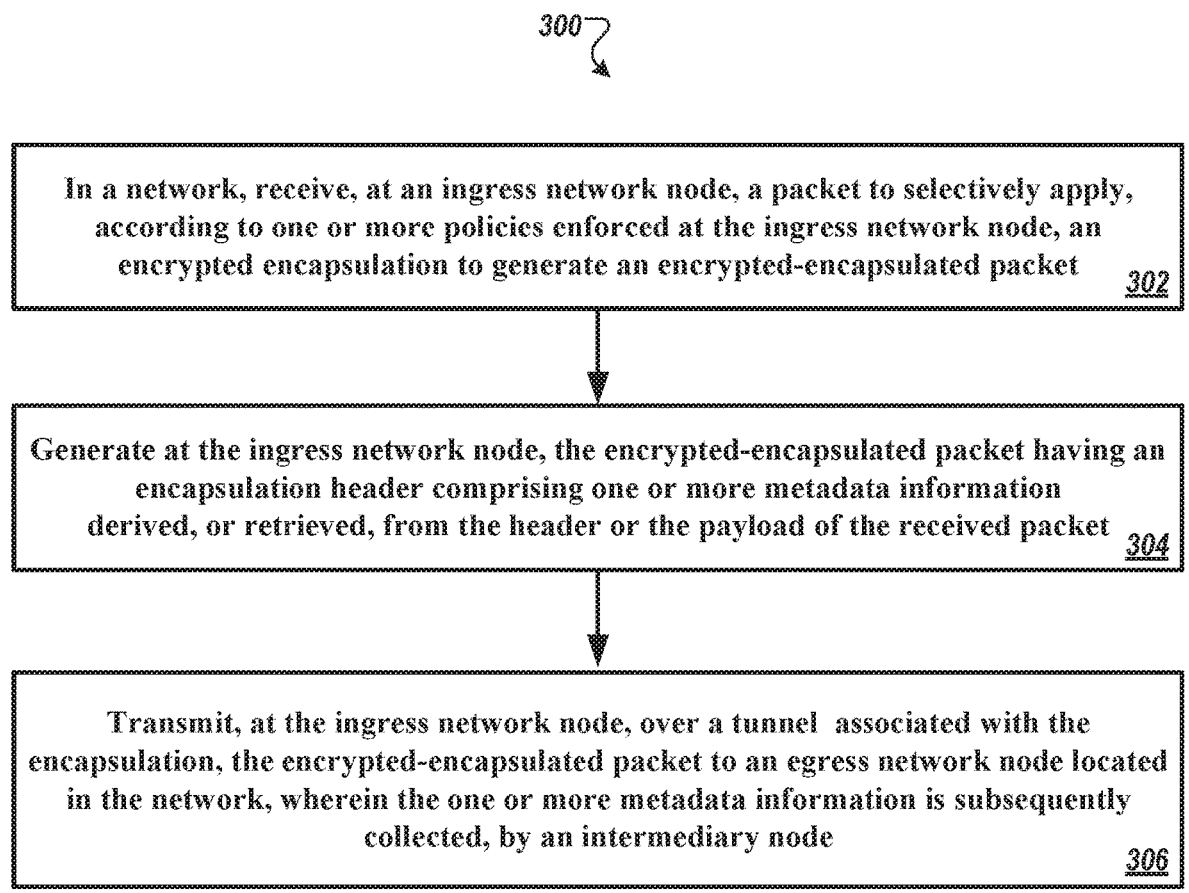
FIG. 3 is a flow diagram of a method to collect security, flow, and/or routing information associated with an encrypted-encapsulated packet in accordance with an illustrative embodiment.

FIG. 3 is a flow diagram of a method 300 to collect security, flow, and/or routing information associated with an encrypted-encapsulated packet. The method 300 includes, in a network (e.g., 100), receiving (step 302), at an ingress network node (e.g., ingress VTEP 202), a packet (e.g., 218) to selectively apply, according to one or more policies (e.g., 216) enforced at the ingress network node (e.g., 202), an encrypted encapsulation (e.g., an encrypted VXLAN encapsulation, encrypted metadata GPE encapsulation, or other secure encapsulation) to generate an encrypted-encapsulated packet (e.g., an encrypted VXLAN-GPE encapsulated packet 224, or encrypted metadata GPE encapsulation, among others).

The method 300 further includes generating (step 304), at the ingress network node (e.g., 202), the encrypted-encapsulated packet (e.g., 224) by (i) encrypting the packet (e.g., 218) having included a packet header (e.g., 220) and a packet payload (e.g., 222) to form an encrypted payload (e.g., 228) of the encrypted-encapsulated packet (e.g., 224) and (ii) inserting an encapsulation header (e.g., 226) to the encrypted-encapsulated packet (e.g., 224). As shown and discussed in relation to FIG. 2, the set of encapsulation headers (e.g., 226) includes one or more metadata information derived, or retrieved, from the header (e.g., 220) or the payload (e.g., 224) of the received packet (e.g., 218). In some embodiments, the set of encapsulation headers (e.g., 226) is a VXLAN-GPE header, a metadata GPE header, or other packet metadata-based encapsulated header. The one or more metadata information (e.g., 230) is inserted (e.g., as one or more unencrypted strings or encrypted strings) into one or more pre-defined fields in the set of encapsulation headers (e.g., 226).

The method 300 further includes transmitting (step 306), at the ingress network node (e.g., 202), over a tunnel associated with the encapsulation (e.g., 204), the encrypted-encapsulated packet (e.g., 224) to an egress network node (e.g., 206) located in the network (e.g., 100, 120). The one or more metadata information (e.g., 230) is subsequently collected, by an intermediary node (e.g., 208, 210, 232), which can be a controller, switch, router, controller, network addressor translation (NAT) device, an intrusion prevention system (IPS), an intrusion detection system (IDS), a deep packet inspection (DPI) device, a firewall, a computing device executing a virtual switch, a network-attached storage (NAS) device, a load balancer (LB) system, a wide-area network/local-area network (WAN/LAN) accelerator, and a computing system executing a virtual machine (VM) or any network device) located between, or able to observe traffic between, the ingress network node (e.g., 202) and the egress network node (e.g., 206). In some embodiments, the metadata information (e.g., 230) is further collected at the ingress node (e.g., 202) and/or the egress node (e.g., 206) (e.g., to make available to the visibility controller 232).

In some embodiments, the collected metadata information (e.g., 230) is subsequently analyzed (e.g., at 232 or 236) individually or in combination with other collected metadata information. Indeed, the intermediary node collects the one or more metadata information (e.g., 230) by interrogating in the one or more pre-defined fields of the set of encapsulation headers (e.g., 226). Because the metadata information is included in the header (e.g., 226) for the purpose of analytics, performance analysis, and network debugging/troubleshooting, it would be insufficient to be used as a substitute or replacement of routing and forwarding tables, for example—the underlying ASICs (e.g., 202) of network switching and routing devices (e.g., 202, 206) would not know to route based on such information, or the information may be incomplete. Indeed, the metadata information inserted into the set of encapsulated headers (e.g., 226) is distinct and separate from such routing and forwarding tables of the encapsulated packet (e.g., 224).

VXLAN-GPE Encrypted-Encapsulated Packet

FIG. 4 is a diagram showing an example encrypted-encapsulated packet 224 having a VXLAN-GPE header and is generated for both security and visibility in accordance with an illustrative embodiment. As shown in FIG. 4, the encrypted-encapsulated packet 224 includes a set of encapsulated headers 226 that includes, for a VXLAN-GPE packet, an outer Ethernet header (shown as "Ethernet" 406), an outer IP header (shown as "IP" 408), an outer UDP header (shown as "UDP" 410), a VXLAN-GPE header (shown as "metadata header" 230), a Datagram Transport Layer Security (DTLS) header (shown as "DTLS" 414), and an Initialization Vector (IV) header (shown as "IV" 416). The metadata header 230 can be transmitted encrypted or in the clear (unencrypted). FIG. 4 further shows the encrypted-encapsulated packet 402 including an encrypted, secured payload 228 that includes a VXLAN header (shown as "VXLAN" 418), an inner Ethernet header (shown as "Ethernet" 420), an inner IP header (shown as "IP" 422), a payload portion 222, and a DTLS trailer portion (shown as "DTLS Trailer" 424). The Ethernet header 420 and IP header 422, collectively, form the header of the received packet 218.

Because the metadata header includes an index value only and does not in itself include an exploitable feature, it may be passed in the clear without encryption or authentication or it may be passed as an encrypted string. Passing the metadata encrypted also means that it can optionally be observed and accounted for as well as acted upon at intermediary nodes if and as desired by making the encryption key for the metadata available to such nodes.

Because the metadata information is dynamically inserted based on user-defined usage (e.g., for the purpose of analytics, performance analysis, and network debugging/troubleshooting), the data itself is random. Indeed, the metadata information can be an encrypted version of the represented metadata or an arbitrary handle and, thus, is a random data from the perspective of any external observer. In some embodiments, a redundant string of the metadata information is included in the encrypted portion of the packet to assess the integrity of the transmission.

VXLAN-GPE Header

Figure 5A:
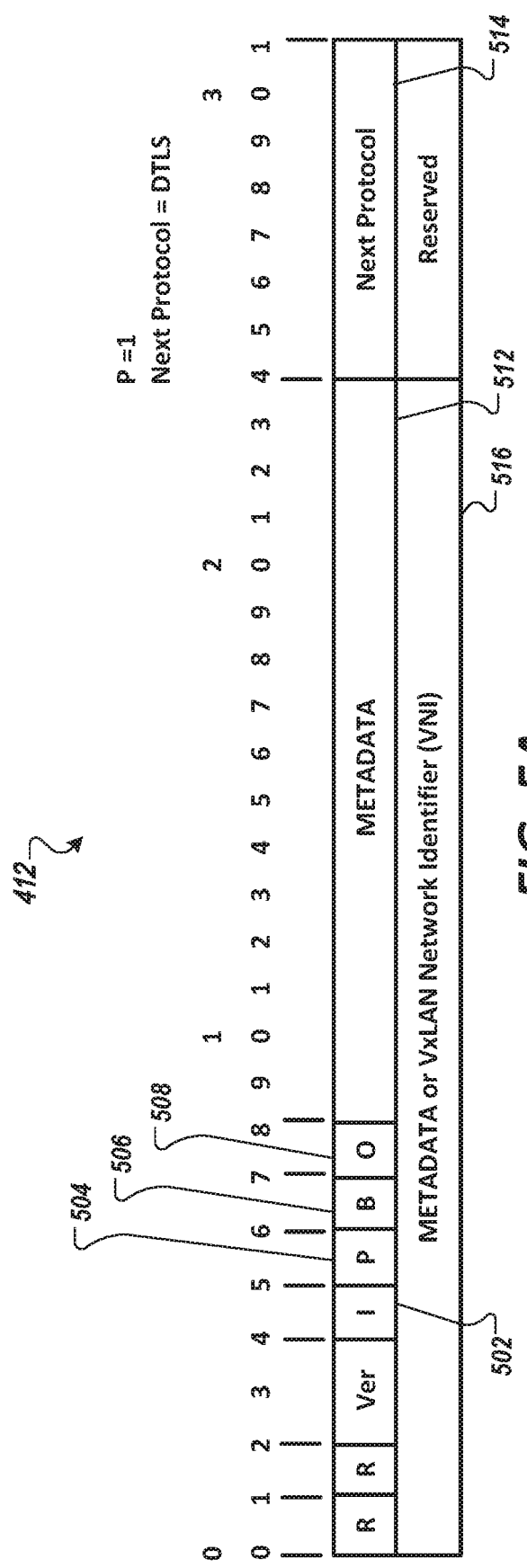
FIG. 5A is a diagram of the VXLAN-GPE header configured with the metadata information for a secured VXLAN packet, in accordance with an illustrative embodiment.

FIG. 5A is a diagram of the VXLAN-GPE header portion configured with the metadata information 230 for a secured VXLAN packet, in accordance with an illustrative embodiment. As shown in FIG. 5A, the VXLAN-GPE header 412 is 8-bytes and includes an 8-bit flag in which an I-flag 502 located at bit number 4 (indexed from bit number 0) is set to "1" for a valid VXLAN Network ID (VNI). The 8-bit flag further includes a next protocol bit ("P" bit) 504 is located at bit number 5 (indexed from bit number 0) and is used to indicate whether a next protocol field is present. For the VXLAN-GPE header 412, the "P" bit 504 is set to "1". The 8-bit flag further includes a BUM Traffic Bit ("B" bit) 506 and an OAM Flag Bit ("O" bit) 508.

In some embodiments, the next protocol bit has a value of "1"; and the next protocol field has a value of, or associated with, "DTLS".

Further description of these VXLAN-GPE header is described in "Generic Protocol Extension for VXLAN—draft-ietf-nvo3-vxlan-gpe-05", published by the IETF, which is incorporated by reference herein in its entirety.

The VXLAN-GPE header 412, as shown in FIG. 5A, includes a first metadata header portion 512 having 16 bits located between bit number 8 and 23 (indexed from bit number 0) at which the metadata information 230 is inserted. The VXLAN-DTLS header includes a second metadata header portion 516 having 24 bits located between bit number 32 and 55 (indexed from bit number 0) at which additional metadata information 230 is inserted. In some embodiments, the VXLAN Network ID is inserted at header portion 516. The VXLAN-GPE header 412 further includes an 8-bit next protocol field 514 that indicates the protocol header immediately following the VXLAN GPE header.

Indeed, this packet format of the VXLAN-GPE header provides both granular cryptographic operation and analytics concurrently. Though shown in FIGS. 4, 5A, 5B, and 5C in relation to a VXLAN GPE encrypted-encapsulated packet, it is contemplated that such encapsulation methodology to include visibility and security can be applied to other encapsulation technology and protocol.

Metadata GPE Header

Figure 5B:
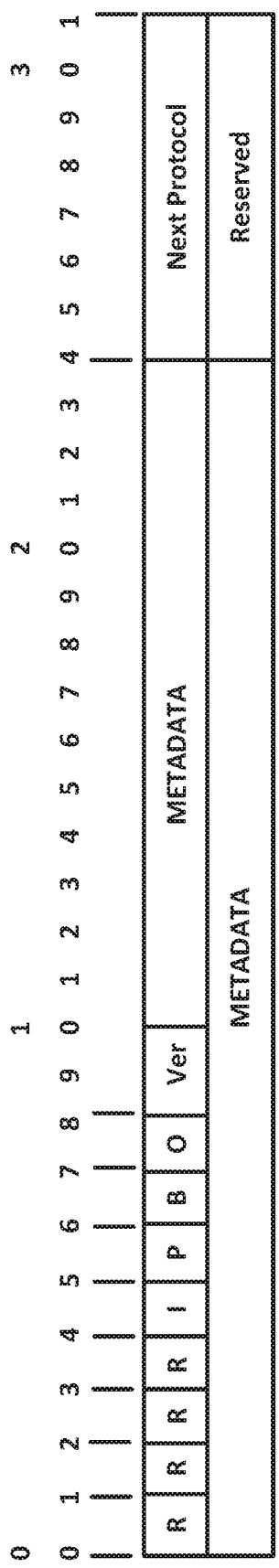
FIG. 5B is a diagram of a metadata GPE header configured with the metadata information for a secured encapsulated packet, in accordance with an illustrative embodiment.
Figure 5C:
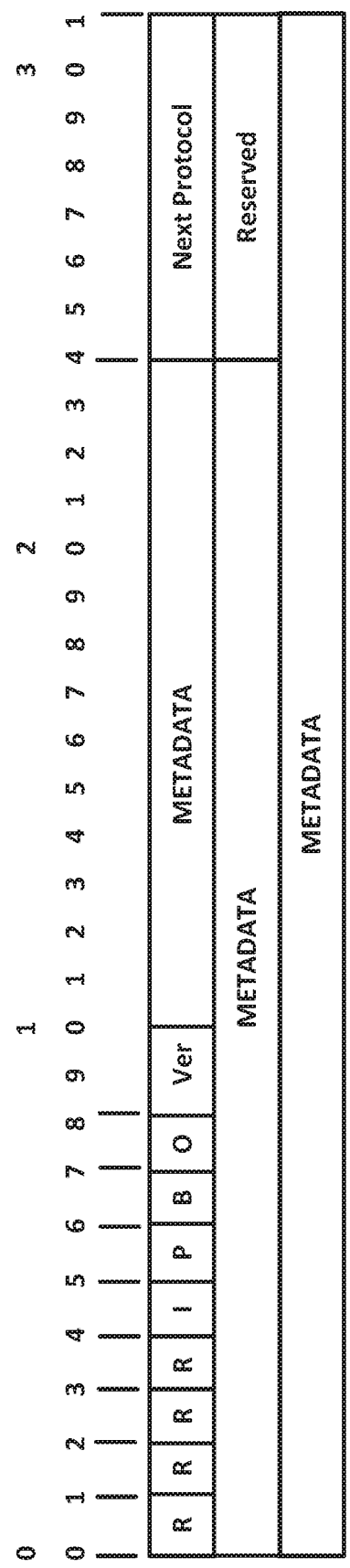
FIG. 5C is a diagram of a metadata GPE header configured with the metadata information for a secured encapsulated packet, in accordance with another illustrative embodiment.

In addition to the VxLAN GPE header, a metadata GPE header may be implemented that can also provide both granular cryptographic operation and analytics concurrently. FIG. 5B is a diagram of a metadata GPE header configured with the metadata information for a secured encapsulated packet, in accordance with an illustrative embodiment. FIG. 5C is a diagram of a metadata GPE header configured with the metadata information for a secured encapsulated packet, in accordance with another illustrative embodiment.

In FIGS. 5B and 5C, an example encrypted-encapsulated packet 224 having a metadata GPE header is provided. In general, this metadata GPE header can be of a user-defined length and includes "next protocol" header to which an encryption header can be inserted along with an arbitrary encrypted packet. In this case, the VxLAN header is part of the encrypted payload. In some embodiments, the metadata GPE header is the last header before the cryptographic payload. In some embodiments, if the metadata GPE header is the first header, it can be determined by UDP.dstPort=Metadata (e.g., a standard number associated with a UDP destination port). And, if it is NOT the first header, it is determined by NextProtocol=Metadata. In some embodiments, the next protocol is used to designate a DTLS frame. The metadata GPE header can be used with any other protocol, crypto or otherwise, that does not need a VXLAN network identifier (VNI). Protocol numbers of the metadata GPE header may be defined in VXLAN GPE and any other GPE standards. Other crypto (and other) next protocols can be added as needed. Crypto Payload type (VxLAN GPO, or GPE etc.) is determined by the SA (security association).

Referring back to FIG. 4, the example encrypted-encapsulated packet 224 includes the outer Ethernet header 406, which is a 14-byte Ethernet frame that includes, for example, an outer destination MAC address, an outer source MAC address, and an Ethertype. The outer IP header 408 includes i) a source IP address associated with the IP address of the VTEP over which the communicating VM (as represented by the inner source MAC address) is running and ii) a destination IP address (e.g., a unicast or multicast IP address). The outer IP header 408 includes i) a source port provided by the VTEP and the destination port being a known UDP port, ii) a destination port, and a source port. Further description of these VXLAN header is described in RFC7348 ("Virtual eXtensible Local Area Network (VXLAN): A Framework for Overlaying Virtualized Layer 2 Networks over Layer 3 Networks") as published by the IETF, which is incorporated by reference herein in its entirety.

Figure 6:
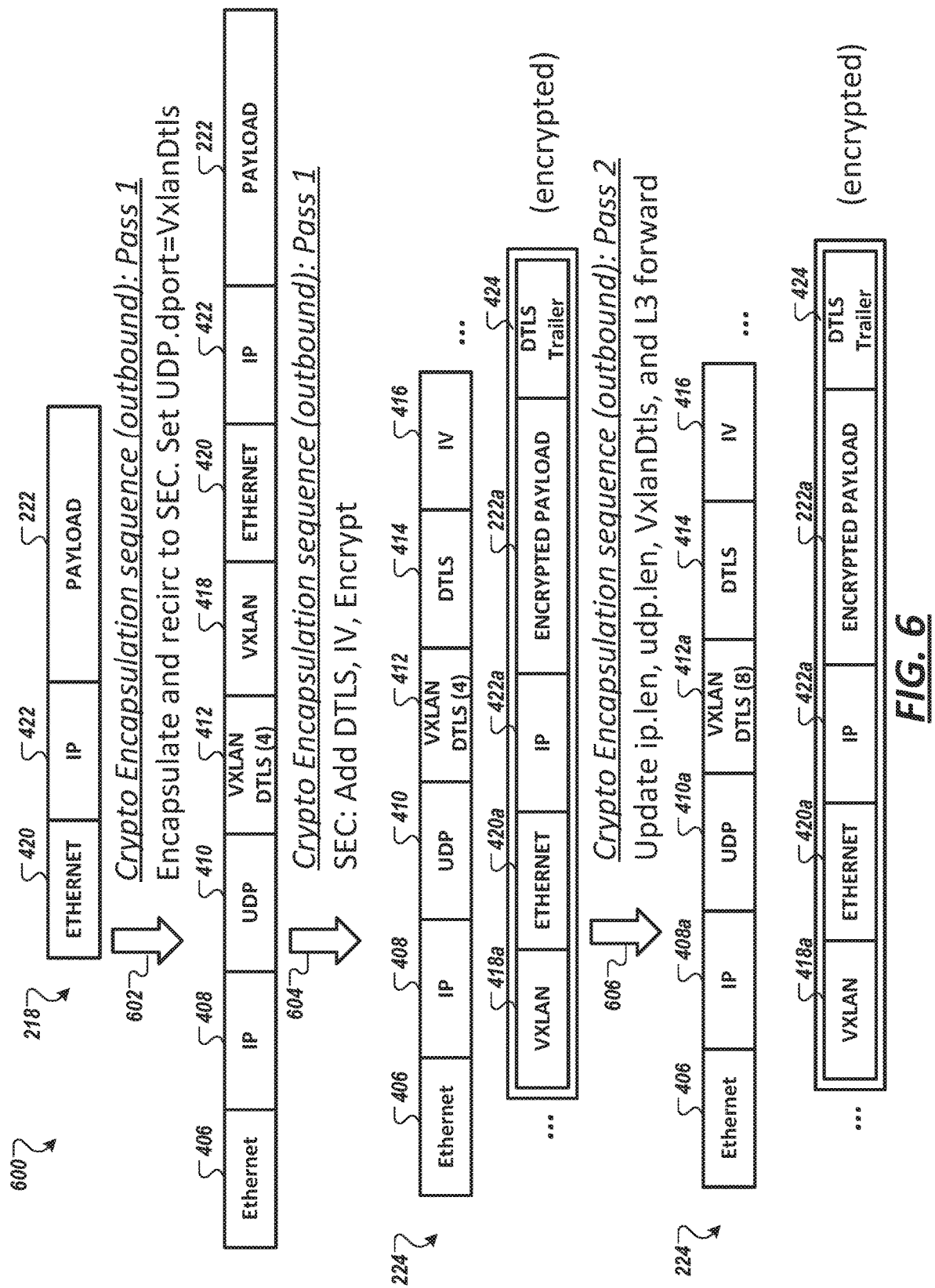
FIG. 6 shows a process of generating the example encrypted-encapsulated packet configured for security and visibility of FIG. 4 in accordance with an illustrative embodiment.

FIG. 6 shows a process 600 of generating the example encrypted-encapsulated packet 224 configured for security and visibility of FIG. 4 from a received packet 218 in accordance with an illustrative embodiment. As shown in FIG. 6, a first operation 602 of a cryptographic encapsulation sequence 600 includes encapsulating the received packet and recirculating to a security operation 604. The encapsulating process 602 may include inserting the outer Ethernet header 406, the outer IP header 408, the UDP header 410, the VXLAN-GPE header 412, and the VXLAN header 418.

During the encapsulating process 602, the metadata information 230 for the VXLAN-GPE header 412 may be reproduced, or derived from, routing or forwarding information in the received packet 218, including, for example, a source IP address (e.g., in the IP header 422) associated with the packet, a destination IP address (e.g., in the IP header 422) associated with the packet, a security group tag (SGT) (e.g., extracted from a Cisco MetaData (CMD) header) associated with the packet, a VXLAN network identifier (VNI) (e.g., in the VXLAN header 418) associated with the packet. In some embodiments, the metadata information 230 for the VXLAN-GPE header 412 may be derived from classification operation including, for example, a user identifier associated with the packet, a user-group identifier associated with the packet, a subnet address associated with the packet, a subnet group address associated with the packet, an application identifier associated with an application (e.g., executable code or binaries) executing on a computing device that is origin to the packet, a virtualized instance identifier of a computing device (e.g., a VM instance) in the network that is origin to the packet.

The second operation 604 includes adding the DTLS header 414, the IV header 416, and the DTLS trailer header 424 and encrypting the VXLAN header 418, the inner Ethernet header 420, the inner IP header 422, and the payload 222. As shown, the encrypted portion 228 includes an encryption of the VxLAN header 418 (shown updated as "VXLAN" 418a), an encryption of the inner Ethernet header 420 (shown updated as "Ethernet" 420a), an encryption of the inner IP header 422 (shown updated as "IP" 422a), an encryption of the payload 222 (shown updated as "Encrypted Payload" 222a), and an encrypted DTLS trailer 424. Indeed, the outer Ethernet field 406, the outer IP field 408, the UDP header 410, the VXLAN GPE header 412, the DTLS header 414, and the IV header 416 remains in the clear (or can be encrypted in part). Though shown in a given order, the sequence or order of the various encrypted headers 406, 408, 410, 412, 414, and 416 may be maintained or they may be changed as a result of the encryption.

A third operation 606 includes inserting a length value (ip.len) of the IP header 408 to the IP header 408 (shown updated as "IP" 408a), a length value (udp.len) of the UDP header 410 to the UPD header 410 (shown updated as "UDP" 410a), and padding the length of the VXLAN-DTLS header 412a to 8 bytes (shown updated as "VXLAN DTLS (8)" 412a), and then transmitting the encapsulated secure packet 224. In some embodiments, the additional 4 bytes added to the VXLAN-DTLS header 412a may be used to include additional metadata information 230.

It is noted that the above description may be tied to specific ASIC operation. Other equivalent processes may be performed depending on the underlying hardware of the network device.

Figure 7:
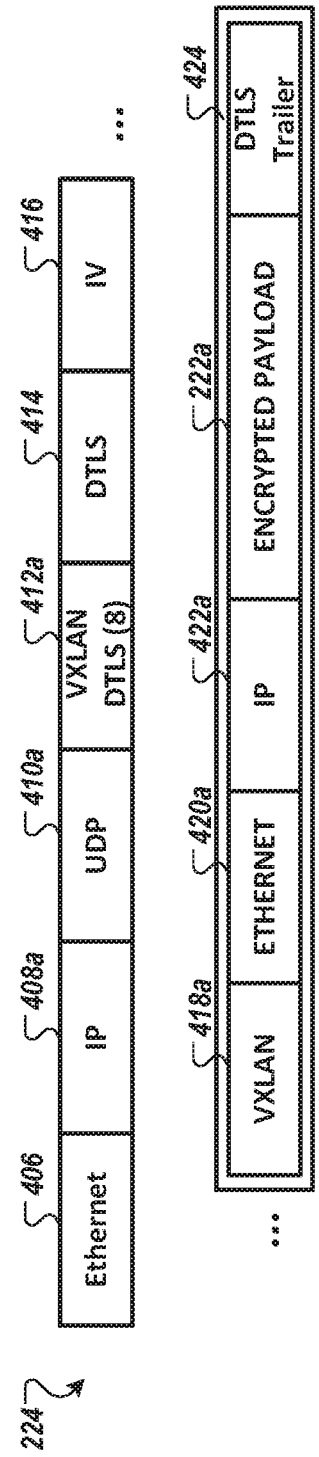
FIG. 7 shows a process of decapsulating the example encrypted-encapsulated packet configured for security and visibility of FIG. 4 in accordance with an illustrative embodiment.

FIG. 7 shows a process 700 of decapsulating the example encrypted-encapsulated packet 224 configured for security and visibility of FIG. 4 in accordance with an illustrative embodiment. The process 700 involves retrieving the SA index from the source and destination IP addresses of the frame, retrieving the VXLAN DTLS information, and retrieving the udp.port=vxlan value from the SA lookup. The process 700 may include deleting 4 bytes (or processing the 4 bytes) from the VXLAN DTLS header, and the ip.len and udp.len values in order to recirculate to the security module. At the security module, the encrypted portion 228 is decrypted, and associated headers are removed, including the VXLAN DTLS 412a, the DTLS header 414, the IV header 416, and the DTLS trailer 424. Following that, the remaining VXLAN packet is decapsulated under conventional processes.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of collecting security, flow, and/or routing information associated with an encrypted-encapsulated packet, the method comprising:
    in a network, receiving, at an ingress network node, a packet to selectively apply, according to one or more policies enforced at the ingress network node, an encrypted encapsulation to generate an encrypted-encapsulated packet;
    generating, at the ingress network node, the encrypted-encapsulated packet by (i) encrypting the packet having included a packet header and a packet payload to form an encrypted payload of the encrypted-encapsulated packet and (ii) inserting a visibility encapsulation header to the encrypted-encapsulated packet, wherein the visibility encapsulation header comprises one or more visibility metadata information derived, or retrieved, from the header or the payload of the received packet to provide visibility into the secured encapsulated packet for subsequent traffic analytic, wherein the one or more visibility metadata information are inserted as an encrypted string into one or more pre-defined fields in the visibility encapsulation header, wherein the encrypted string is generated from a different encryption key than that used to generate the encrypted payload;
    transmitting, at the ingress network node, over a tunnel, the encrypted-encapsulated packet to an egress network node located in the network, wherein the one or more visibility metadata information is subsequently collected, by an intermediary node located between, or able to observe traffic between, the ingress network node and egress network node, to be subsequently analyzed individually or in combination with other collected visibility metadata information, wherein the intermediary node collects the one or more visibility metadata information by interrogating the encrypted string in the one or more pre-defined fields of the visibility encapsulation header; and
    forwarding, at the intermediary node, the one or more visibility metadata information to a collector for subsequent analysis, wherein the collector is configured to store the one or more visibility metadata information and other metadata information collected from other encrypted-encapsulated packets.

2. The method of claim 1, wherein the collector is further configured to store IP traffic data collected from the network.

3. The method of claim 1, further comprising:
    receiving, at the egress network node, the encrypted-encapsulated packet; and
    generating, at the egress network node, the packet, wherein the packet having included the packet header and packet payload is generated by decrypting the encrypted payload.

4. The method of claim 1,
    wherein the visibility encapsulation header comprises a VXLAN-GPE header, and
    wherein the VXLAN-GPE header comprises a number of allocate-able bits for inclusion of the one or more visibility metadata information selected from the group consisting of: at least 16 bits, at least 32 bits, and at least 48 bits.

5. The method of claim 1,
    wherein the visibility encapsulation header comprises a metadata GPE header, and
    wherein the metadata GPE header comprises a number of allocate-able bits for inclusion of the one or more visibility metadata information selected from the group consisting of at least 24 bits and at least 56 bits.

6. The method of claim 1, wherein the one or more visibility metadata information are specified in the one or more policies, wherein the one or more policies are editable i) by a controller located in the network and/or ii) by a network administrator through a computing terminal having access to the network.

7. The method of claim 1, wherein the one or more visibility metadata information includes an identifier selected from the group consisting of:
 a source IP address associated with the packet;
 a destination IP address associated with the packet;
 a security group tag (SGT) associated with the packet;
 a VXLAN network identifier (VNI) associated with the packet;
 a user identifier associated with the packet;
 a user-group identifier associated with the packet;
 a subnet address associated with the packet;
 a subnet group address associated with the packet;
 an application identifier associated with an application executing on a computing device that is origin to the packet;
 a virtualized instance identifier of a computing device in the network that is origin to the packet; and
 a combination thereof.

8. A system comprising:
 a network interface having instructions stored thereon, wherein execution of the instructions by a processor causes the interface to:
 upon receipt of a packet, generate an encrypted-encapsulated packet by (i) encrypting the packet having included a packet header and packet payload to form an encrypted payload of the encrypted-encapsulated packet and (ii) inserting a visibility encapsulation header to the encrypted-encapsulated packet, wherein the visibility encapsulation header comprises one or more visibility metadata information derived, or retrieved, from the header or payload of the received packet to provide visibility into the secured encapsulated packet for subsequent traffic analytic, wherein the one or more visibility metadata information as an encrypted string is inserted into one or more pre-defined fields of the visibility encapsulation header, wherein the encrypted string is generated from a different encryption key than that used to generate the encrypted payload; and
 transmit, over a tunnel, the encrypted-encapsulated packet to an egress network node located in the network,
 wherein the one or more visibility metadata information is subsequently collected, by an intermediary node located between, or able to observe traffic between, the ingress network node and egress network node, to be subsequently analyzed individually or in combination with other collected metadata information, wherein the intermediary node collects the one or more visibility metadata information by interrogating the encrypted string in the one or more pre-defined fields of the visibility encapsulation header, and
 wherein the one or more visibility metadata information is forwarded, by the intermediary node, to a collector for subsequent analysis, wherein the collector is configured to store the one or more visibility metadata information and other metadata information collected from other encrypted-encapsulated packets.

9. The system of claim 8, wherein the visibility encapsulation header comprises a VXLAN-GPE header, and wherein the VXLAN-GPE header comprises a number of allocate-able bits for inclusion of the one or more visibility metadata information selected from the group consisting of: at least 16 bits, at least 32 bits, and at least 48 bits.

10. The system of claim 8,
 wherein the visibility encapsulation header comprises a metadata GPE header, and
 wherein the metadata GPE header comprises a number of allocate-able bits for inclusion of the one or more visibility metadata information selected from the group consisting of at least 24 bits and at least 56 bits.

11. The system of claim 8, wherein the visibility encapsulation header comprises a VXLAN DTLS header or a metadata DTLS header.

12. The system of claim 8, wherein the one or more visibility metadata information is specified in one or more policies, wherein the one or more policies are editable i) by a controller located in the network or ii) by a network administrator through a computing terminal having access to the network, the system further comprising:
 a memory having instructions stored thereon, wherein execution of the instructions by one or more processors of the system, cause the processor to:
 receive the one or more policies from a computing device external to the system; and
 apply the one or more policies to incoming traffic received at the network interface.

13. The system of claim 8, wherein the one or more visibility metadata information includes an identifier selected from the group consisting of:
 a source IP address associated with the packet;
 a destination IP address associated with the packet;
 a security group tag associated with the packet;
 a VXLAN network identifier (VNI) associated with the packet;
 a user identifier associated with the packet;
 a user-group identifier associated with the packet;
 a subnet address associated with the packet;
 a subnet group address associated with the packet;
 a source application executing on a computing device that is origin to the packet;
 a virtualized instance of a computing device in the network that is origin to the packet; and
 a combination thereof.

14. A system comprising:
 a network interface having instructions stored thereon, wherein execution of the instructions, cause the interface to:
 upon receipt of an encrypted encapsulated packet having an encrypted-encapsulation header and an encrypted payload, generate an unencrypted packet having included a packet header and a packet payload from the encrypted payload; and
 transmit the unencrypted packet to a next hop in the network based on routing information identified in the unencrypted packet,
 wherein the encrypted-encapsulated packet was generated by (i) encrypting the packet having included the packet header and the packet payload to form the encrypted payload and (ii) inserting a visibility encapsulation header to the encrypted-encapsulated packet, wherein the visibility encapsulation header comprises one or more visibility metadata information derived, or retrieved, from the packet header or the packet payload to provide visibility into the secured encapsulated packet for subsequent traffic analytic, wherein the one or more metadata information is inserted as an encrypted string into one or more pre-defined fields of the visibility encapsulation header, wherein the encrypted string is generated from a different encryption key than that used to generate the encrypted payload, and wherein the one or more visibility metadata information is collectable, by an intermediary node located between, or able to observe traffic between, the ingress network node and egress network node, to be analyzed individually or in combination with other collected metadata information, wherein the intermediary node collects the one or more visibility metadata information by interrogating in the one or more pre-defined fields of the visibility encapsulation header, and wherein the one or more visibility metadata information is forwarded, by the intermediary node, to a collector for subsequent analysis, wherein the collector is configured to store the one or more visibility metadata information and other metadata information collected from other encrypted-encapsulated packets.

15. The system of claim 14, wherein the network interface is configurable via instructions to forward the one or more visibility metadata information to a collector located in the network, wherein the collector is configured to store the one or more visibility metadata information and other metadata information collected from other encrypted-encapsulated, wherein the visibility encapsulation header comprises a VXLAN DTLS header or a GPE DTLS header, and wherein the one or more visibility metadata information includes an identifier selected from the group consisting of:

a source IP address associated with the packet;
a destination IP address associated with the packet;
a security group tag associated with the packet;
a VXLAN network identifier (VNI) associated with the packet;
a source IP address associated with the packet;
a destination IP address associated with the packet;
a security group tag associated with the packet;
a VXLAN network identifier (VNI) associated with the packet;
a user identifier associated with the packet;
a user-group identifier associated with the packet;
a subnet address associated with the packet;
a subnet group address associated with the packet;
a source application executing on a computing device that is origin to the packet;
a virtualized instance of a computing device in the network that is origin to the packet; and
a combination thereof.

* * * * *